United States Patent [19]
Deckler

[11] 3,999,690
[45] Dec. 28, 1976

[54] METERING APPARATUS FOR A SEED PLANTER

[75] Inventor: Harry C. Deckler, South Bend, Ind.
[73] Assignee: White Farm Equipment Company, Cleveland, Ohio
[22] Filed: Sept. 17, 1975
[21] Appl. No.: 614,074
[52] U.S. Cl. .............................. 222/194; 221/211; 222/410
[51] Int. Cl.² ..................... B67D 5/54; G01F 11/20
[58] Field of Search ............ 222/194, 410; 221/211

[56] References Cited
UNITED STATES PATENTS

| | | | |
|---|---|---|---|
| 2,314,031 | 3/1943 | Colburn | 222/194 |
| 3,412,908 | 11/1968 | Ferrault | 222/194 |
| 3,693,833 | 9/1972 | Weitz | 221/211 |

*Primary Examiner*—Allen N. Knowles
*Assistant Examiner*—Hadd Lane
*Attorney, Agent, or Firm*—Lockwood, Dewey, Zickert & Alex

[57] ABSTRACT

An improved seed metering apparatus for use in a seed planter of the type having a seed storage hopper and a drop chute for depositing seeds into an underlying furrow comprises a rotatably driven seed metering disc having a plurality of seed receiving pockets about its periphery. As the planter is pulled forward the metering disc rotates and each pocket is caused to pass through a pressurized chamber wherein a predetermined number of seeds are picked up, and then to pass through a compartment of reduced pressure wherein the seeds are released into the drop chute. A pressure-sealed wear-resistant engagement is obtained between the seed metering disc and the chamber walls by means of replaceable wear plates mounted on the wall edges and a coil spring carried on the disc mounting shaft which causes the metering disc to bear against the wear plates during operation.

6 Claims, 6 Drawing Figures

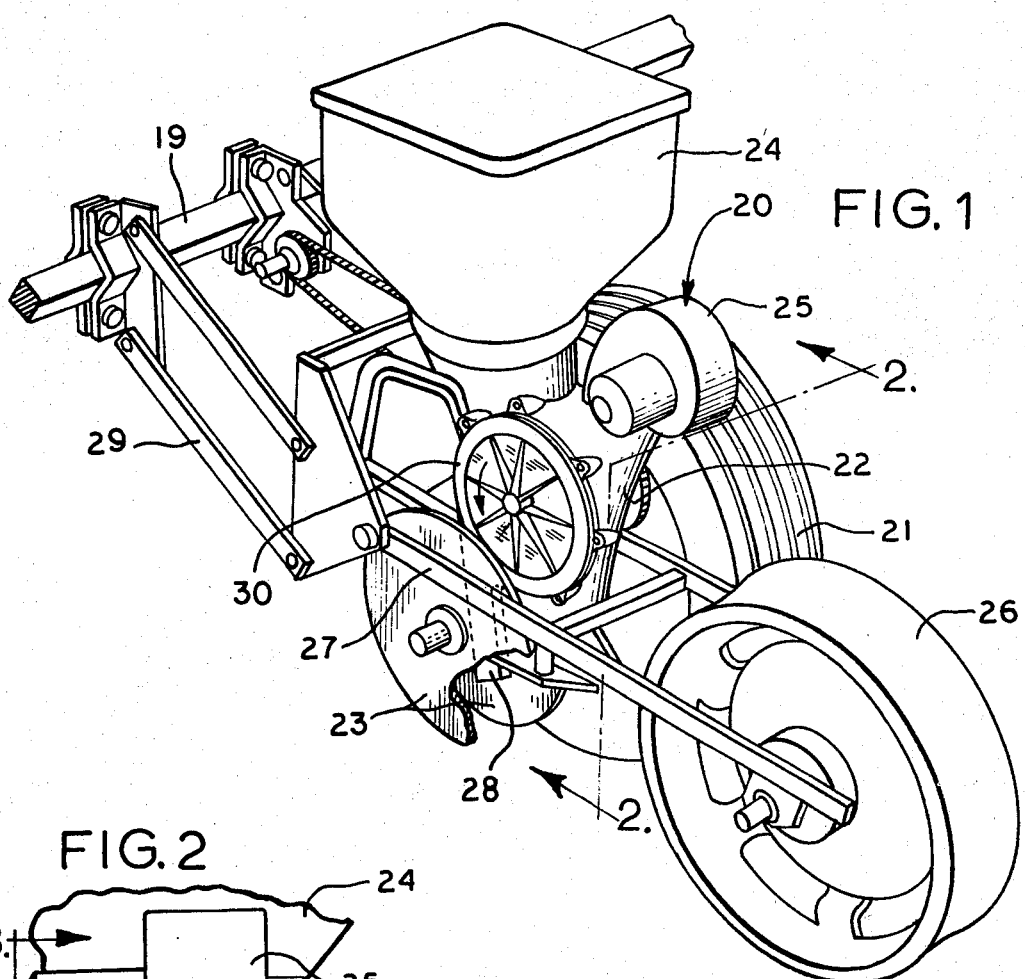

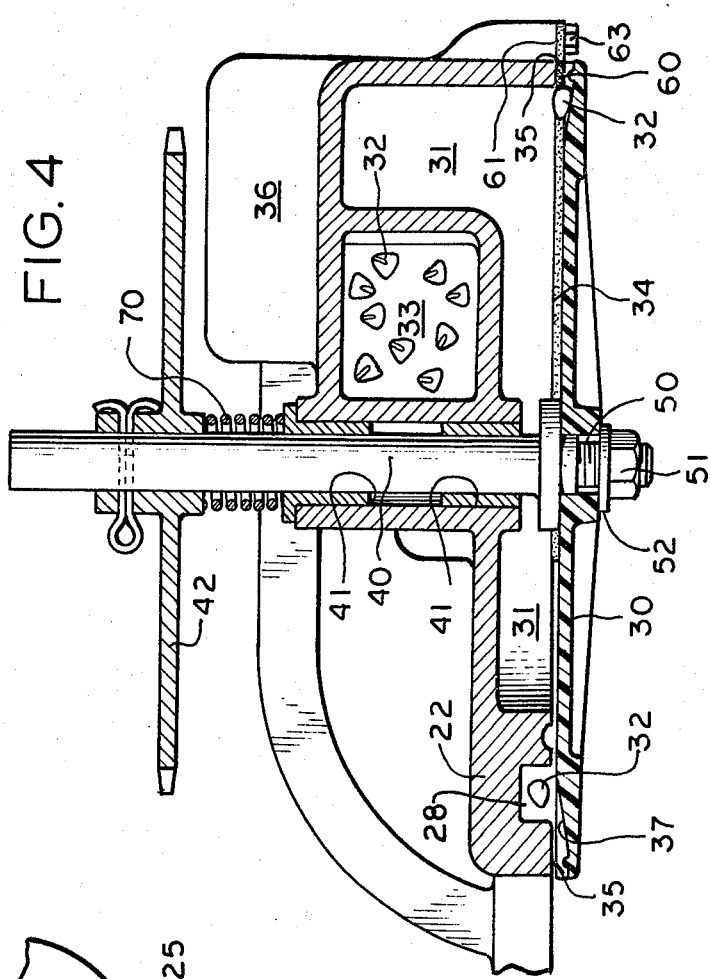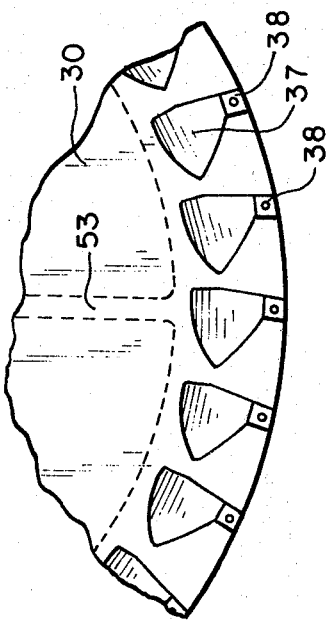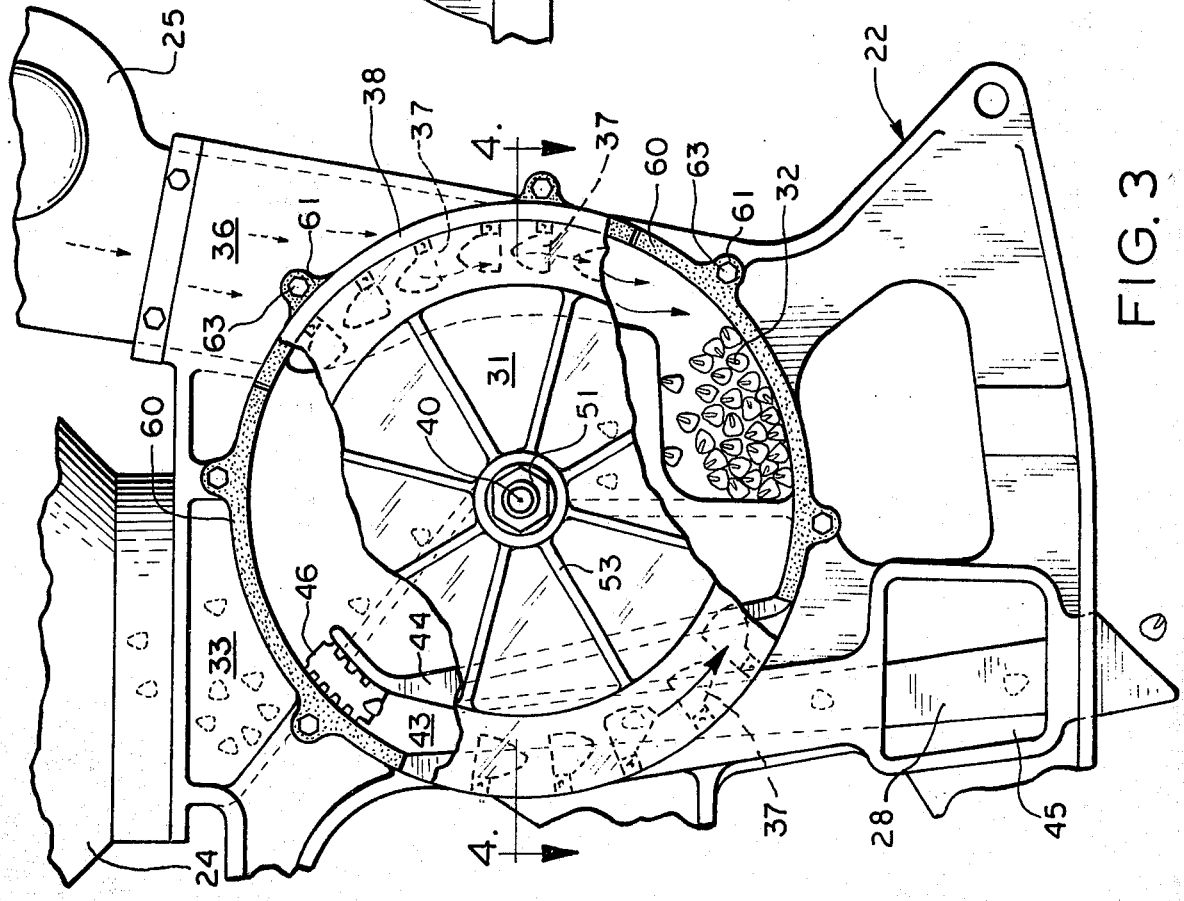

METERING APPARATUS FOR A SEED PLANTER

BACKGROUND OF THE INVENTION

This invention is directed generally to seed planters, and more particularly to an improved seed metering apparatus for seed planters wherein seeds are deposited from a gravity-feed hopper into an underlying furrow with improved accuracy and speed.

Modern high-production farming operations require a seed planter capable of accurately planting a variety of different seeds at the highest possible speed. One seed planter which has provided particularly good performance in this respect is described in U.S. Pat. No. 3,888,387, dated June 10, 1975, and assigned to the present assignee. In this seed planter an air pressure source is utilized to hold seeds in seed pockets along the periphery of a rotatably driven wheel, the seeds being dropped with precise regularity from the pockets through a drop chute into an underlying furrow.

The present application is directed to an improved construction for such metering apparatus which provides increased wear resistance and improved performance.

Accordingly, it is a general object of the present invention to provide a new and improved apparatus for metering seed flow in a seed planter.

It is another object of the present invention to provide a new and improved metering apparatus for a seed planter which deposits seeds with improved accuracy and speed.

It is another object of the present invention to provide a new and improved metering apparatus for a seed planter which is less susceptible to wear.

It is another object of the present invention to provide a new and improved metering apparatus for a seed planter wherein components most subject to wear can be readily replaced.

It is another object of the present invention to provide a new and improved metering apparatus for a seed planter which incorporates an improved pressure seal.

SUMMARY OF THE INVENTION

The invention is directed, in a seed planter of the type which deposits seeds from a hopper into an underlying furrow at regular intervals, and which has metering apparatus including a housing defining a chamber having an opening with a margin lying in a single plane, means including a drop chute for discharging seeds into the furrow, gravity feed means for conveying seeds from the hopper to the chamber, a disc-shaped seed metering member having a flat inwardly-facing peripheral portion overlying the margin of the opening and having a plurality of pockets each dimensioned to receive a predetermined number of the seeds, the metering member being rotatably mounted so as to bring each of the pockets sequentially in communication with the chamber and the drop chute, and each of the pockets being provided with a pressure-relief passageway communicating to the outside of the housing, means for supplying pressurized air to the chamber to urge the seeds into the pockets, means for at least substantially isolating the pockets from the pressurized air while the pockets are in communication with the drop chute to allow the seeds in the pockets to fall into the drop chute, and means for rotating the metering member as the seed planter moves along the furrow, to the improvement comprising wear reduction means including a wear plate removably mounted on the housing so as to overlie at least a portion of the margin of the opening for coacting with the peripheral portion of the seed metering member to establish at least a partial wear-resistant pressure seal between the metering member and the housing.

The invention is further directed, in a seed planter having metering means for feeding seeds from a gravity discharge seed supply hopper into a chute, the metering means comprising a housing having an opening at least a portion of the outer margin of which is defined by an arcuate surface lying in a plane, and having a seed-receiving portion wherein seeds collect in gravity-fed communication with the seed supply hopper and with the opening; and having a seed-discharging portion in gravity-discharge communication with the chute means, a rotatable cover for the housing opening having an annular surface with a curvature at least approximately equal to the curvature of the arcuate surface and lying in a single plane, the cover having a plurality of arcuately arranged seed-receiving pockets opening into the annular surface and in seed pickup communication with the seed-receiving portion of the housing as the cover rotates, means for rotatably mounting the cover whereby the annular surface thereof continuously moves over the arcuate surface in juxtaposed relation thereto; means for rotating the cover operatively connected therewith, means for producing sufficient pneumatic pressure within the housing to hold the seeds within the pockets as the cover rotates, and means for at least substantially shielding the seed pockets from the air flow as the pockets pass the seed-discharging portion whereby seeds fall from the pockets into the chute means, to the improvement comprising means including a wear plate disposed on at least a portion of the margin of the opening for coacting with the peripheral portion of the seed metering member to establish at least a partial wear-resistant pneumatic seal between the metering member and the housing.

The invention is further directed, in a seed planter of the type which deposits seeds from a hopper into an underlying furrow at regular intervals, and which has seed metering apparatus including a housing defining a chamber having an opening with a margin lying in a single plane, means including the drop chute for discharging seeds into the furrow, gravity feed means for conveying seeds from the hopper to the chamber, a disc-shaped seed metering member having a flat inwardly-facing peripheral portion overlying the margin of the opening and having a plurality of pockets each dimensioned to receive a predetermined number of the seeds, the metering member being rotatably mounted so as to bring each of the pockets sequentially in communication with the chamber and the drop chute, and each of the pockets being provided with a pressure-relief passageway communicating to the outside of the housing, means for supplying pressurized air to the chamber to urge the seeds into the pockets, means for at least substantially isolating the pockets from the pressurized air while the pockets are in communication with the drop chute to allow the seeds in the pockets to fall into the drop chute, and means for rotating the metering member as the seed planter moves along the furrow, to the improvement comprising retaining means operative along the axis of rotation of the seed metering member for urging the peripheral portion of the metering member into sliding engagement with the margin of the opening.

BRIEF DESCRIPTION OF THE DRAWINGS

The features of the present invention, which are believed to be novel, are set forth with particularity in the appended claims. The invention, together with the further objects and advantages thereof, may best be understood by reference to the following description taken in connection with the accompanying drawings, in the several figures of which like reference numerals identify like elements, and in which:

FIG. 1 is a perspective view of a seed planter incorporating a seed metering apparatus constructed in accordance with the present invention.

FIG. 2 is a view of the seed metering apparatus employed in the seed planter of FIG. 1 taken along lines 2—2 of FIG. 1.

FIG. 3 is an enlarged front elevational view of the seed metering apparatus.

FIG. 4 is a view of the seed metering apparatus taken along lines 4—4 of FIG. 3.

FIG. 5 is an enlarged view of a portion of the seed metering disc employed in the seed metering apparatus showing the seed pockets contained thereon.

FIG. 6 is an exploded perspective view of the principal components of the seed metering apparatus.

DESCRIPTION OF THE PREFERRED EMBODIMENT

Referring to the figures, and particularly to FIG. 1, a seed metering apparatus constructed in accordance with the invention is shown in conjunction with a seed planter 20, which, with the exception of the metering system, may be conventional in design and construction. A preferred construction for this planter is described in the aforementioned U.S. Pat. No. 3,888,387.

Seed planter 20 is, in this instance, a trailer-type planter, having a support tire 21 which is utilized to transport the planter when not planting and to provide drive power to the planter when planting. To enable the simultaneous planting of a plurality of parallel rows, the seed planter comprises a plurality of individual planter units arranged side-by-side. Each unit, as shown in FIG. 1, includes a casting or housing 22, a pair of furrow-opening discs 23, a gravity feed seed hopper 24, a blower 25, a soil firming or tamping wheel 26, a generally horizontal frame member 27, and a drop chute 28. The frame members are connected by means of individual parallel-arm linkages 29 to a main frame 19, which is coupled to the tractor (not shown) by means of an appropriate hitch (not shown).

Referring to FIGS. 2–4, each planter unit incorporates a seed metering apparatus for dispensing seeds from a hopper 24 at a controlled rate into a drop chute 28. The drop chute 28 deposits the seeds into furrows prepared by the furrow-opening discs 23 associated with the planter units, the soil firming wheels 26 at the rear of the planter units closing and firming the soil around the seeds as the seed planter is drawn forward.

The housing 22 of each planter unit, which may be molded of metal or other suitable material, includes an internal chamber 31 to which the seeds 32 to be planted are gravity fed from hopper 24 by way of a feed chute 33, which may be an integral part of the housing 22 as shown, or a separate element suitably attached thereto. The chamber 31 is provided with a generally annular opening 34 (FIG. 4) having a flat marginal surface 35 disposed in a single plane about its periphery. Air under pressure is introduced into the chamber 31 by way of an air duct 36 which communicates with blower 25.

To control the dispensing of seeds 32 the seed metering apparatus incorporates a seed metering disc 30 overlying opening 34 so as to at least partially pressure-seal chamber 31. As best seen in FIGS. 3–5, this metering disc 30 has a plurality of equi-spaced inwardly-facing seed-receiving pockets 37 about its periphery, each of which is equipped with a passageway 38 which extends radially on the inside surface of the disc to the exterior of the housing.

The metering disc 30 is mounted on a shaft 40, which extends through a bearing sleeve 41 (FIG. 4) in housing 22. A sprocket 42 on the other end of shaft 40 and a coacting drive chain (not shown) rotatably couple the metering disc 30 to the planter support wheel 21 so that the metering disc rotates as the planter is drawn forward.

A second chamber 43 (FIG. 2) is formed in housing 22 at the upper end of drop chute 28 along the arcuate path followed by the pockets 37 as the metering disc 30 rotates. This chamber is pneumatically isolated by a baffle 44 from the pressurized chamber 31 so as to reduce the air pressure exerted on pockets 37 to the extent that seeds 32 seated therein drop into the underlying portion of the drop chute 28 and into the underlying furrow when the pockets come into communication with the chamber.

Housing 22 may also be provided with a third chamber 45 disposed along drop chute 28 for accommodating means for detecting the presence of seeds in the drop chute. By providing a suitable detector in this chamber it is possible to automatically warn the operator should the planter become inoperative or run out of seeds, preventing loss of crops and wasted effort.

The seed metering disc 30 may be molded of a high impact flexible plastic material, and is preferably transparent to allow the operator to visually confirm the presence of seeds in the pockets and the availability of an adequate supply of seeds. A plurality of radially extending ribs 53 may be molded into the metering disc to increase its rigidity, and the disc may be formed slightly inwardly concave to provide a more positive pressure seal with the margins of housing 22.

The seed metering disc 30 is preferably mounted on shaft 40 by means of a threaded portion 50 (FIG. 6) on the end of the shaft and a hex nut 51 which is tightened on this threaded portion over a washer 52 so as to bear against the metering disc. Shaft 40 may be keyed and disc 30 may be provided with a coacting keyway to assure locked rotation between these elements. While metering disc 30 is shown with a plurality of wedge-shaped seed-receiving pockets 37 about its circumference, which are particularly well adapted for metering kernels of corn, it will be appreciated that for other seed planting applications other sizes and shapes of pockets may be desirable, the metering disc 30 being readily removable from shaft 40 to facilitate such substitution.

In operation a metering disc 30 having seed-receiving pockets 37 appropriate for the seeds 32 being planted is selected and installed on shaft 40 by tightening hex nut 51 over the threaded portion 50 of the shaft. A quantity of seeds 32 to be planted is next loaded into hopper 24 and allowed to drop through feed chute 33 into chamber 31. To commence planting blower 35 is energized and chamber 31 is pressurized through duct 36. As the planter 20 is pulled along the ground by the tractor, a furrow is opened immediately ahead of the planter by the disc 23. At the same time, the seed metering disc 30 rotates counterclockwise (as viewed in FIG. 2) at a speed proportional to the speed of the planter, the seed-receiving pockets 37 being carried in an arcuate path into communication with the seeds 32 in chamber 31. In passing through chamber 31 each pocket 37 picks up a predetermined number of the seeds 32 by reason of the pressurization within chamber 31 and the pressure differential generated across the seeds as the pressurized air escapes through the passageway 38 associated with the pocket.

The seed-receiving pockets 37 next pass through the non-pressurized chamber 43, wherein the seeds drop into drop chute 28 for conveyance into the associated underlying furrow. A resilient flap-like pressure gate 46 may be provided between the pressurized chamber 31 and the non-pressurized chamber 43 to make this release more positive and to remove excess seeds from the pockets. After the pockets 37 have released their seeds, they continue counterclockwise to again enter chamber 31 and pick up another quantity of seeds.

In accordance with one aspect of the invention, the wear resistance of the pressure seal between the marginal surface 35 of chamber 31 and metering disc 30 is enchanced by the provision of a plurality of wear plates 60 on surface 35. Referring to FIG. 6, these wear plates are preferably formed as thin arcuate segments which, when joined end-to-end, extend substantially around the margins of chamber 31. Each of the wear plates 60 includes a pair of radially-projecting tab portions 61 to facilitate mounting on housing 22. These tab portions 61 include apertures 62 through which threaded fasteners in the form of machine screws 63 are inserted for threaded engagement with complementarily threaded bores provided on flanges 64 on housing 22.

The wear plates 60 may each be formed of a thin sheet of stainless steel or other metallic material having good wear resistant properties. In one embodiment wear plates formed of 304 series 0.025 inch thick half hard stainless steel stock provided good results in conjunction with a plastic metering disc having a diameter of approximately 10 ⅝ inches operating under a net compressive force of 2–5 pounds. However, it will be appreciated that other materials may be used to form the wear plates and that epoxy coatings or other wear resistant surfaces may be provided.

Absent wear plates 60, the plastic metering disc 30, by reason of its relative softness, tends to accumulate dust particles on its surfaces, these dust particles becoming embedded in the soft surface of the disc and tending to act as an abrasive agent against the coacting surface 35 of housing 22 so as to cause unnecessary wear to the housing. Use of the replaceable wear plates 60 not only reduces this tendency to wear, but also enables replacement of the wear surface by merely removing machine screws 53. This prolongs the life of metering disc 30 and housing 22, and hence the useful life of the seed planter.

While wear plates 60 have been shown as three semiarcuate segments disposed about the periphery of housing 22, it will be appreciated that these plates can be provided in other forms. For instance, a greater or lesser number of plates could be provided and the plates need not necessarily be arcuate to provide the necessary protection against wear for housing 22. Furthermore, the wear plates 60 can be either flush mounted on surface 35 as shown in the figures, or may be partially recessed in an appropriately dimensioned channel or depression provided on surface 35.

In accordance with another aspect of the invention, to maintain the margins of metering disc 30 snugly engaged to wear plates 60 a compression spring 70 (FIG. 4) is fitted over the end of shaft 40 between housing 22 and sprocket 42. This spring exerts an axial force on shaft 40 in a direction away from the rear side of housing 22, thereby tending to draw the metering disc 30 up against the wear plates. This enhances the seal between housing 22 and the metering disc 30, and helps to overcome dimensional variations resulting from production tolerances and wear between the two elements.

In one embodiment a spring having a diameter of approximately 15/16 inches, an uncompressed length of approximately 1 ⅛ inches, a compressed length of approximately 9/16 inches, and exerting an axial force of approximately 12 pounds, provided good results when used in conjunction with a metering disc having a diameter of approximately 10 ⅝ inches mounted on a shaft having a diameter of ⅞ inches and a length of approximately 8 inches, and on which a net axial force of 8 pounds was exerted by pressurized air in chamber 31.

The capability of the aforedescribed seed metering apparatus to operate at high speed with great accuracy is enhanced by the improvements provided by the invention, which result in improved operating efficiency and extended operating life without significantly adding to the complexity or cost of manufacture of the seed planter.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a seed planter of the type which deposits seeds from a hopper into an underlying furrow at regular intervals, and which has seed metering apparatus including a housing defining a chamber having an opening with a margin lying in a single plane;

means including a drop chute for discharging seeds into said furrow;

gravity feed means for conveying seeds from said hopper to said chamber;

a disc-shaped seed metering member having a flat inwardly-facing peripheral portion overlying and in pressure engagement with said margin of said opening, said metering member having a plurality of pockets each dimensioned to receive a predetermined number of said seeds, and being rotatably mounted so as to bring each of said pockets sequentially in communication with said chamber and said drop chute;

means for urging said seeds into said pockets from said chamber and retaining said seeds in said pockets as said metering member rotates;

means for releasing said seeds from said pockets while said pockets are in communication with said drop chute to allow the seeds in said pockets to fall into said drop chute; and means for rotating said metering member as said seed planter moves along said furrow;

the improvement comprising;
wear reduction means including a wear plate removably mounted on said housing so as to overlie at least a substantial portion of said margin of said opening engaged by said seed metering member to establish at least a partial wear-resistant engagement between said metering member and said housing.

2. A metering apparatus for a seed planter as defined in claim 1 wherein said wear reduction means include a plurality of arcuate wear plate segments arranged around said margin of said opening.

3. A metering apparatus for a seed planter as defined in claim 1 wherein means are provided for biasing said peripheral portion of said metering member against said wear plate.

4. In a seed planter having a metering means for feeding seeds from a gravity discharge seed supply hopper into a chute, said metering means comprising
a housing having an opening at least a portion of the outer margin of which is defined by an arcuate surface lying in a plane, and having a seed-receiving portion wherein seeds collect in gravity-fed communication with said seed supply hopper and with said opening; and having a seed-discharging portion in gravity-discharge communication with said chute;
a rotatable cover for said housing opening having an annular surface with a curvature at least approximately equal to the curvature of said arcuate surface and lying in a single plane, said cover having a plurality of arcuately arranged seed-receiving pockets opening into said annular surface and in seed pickup communication with said seed-receiving portion of said housing as said cover rotates;
means for rotatably mounting said cover whereby said annular surface thereof continuously moves over said arcuate surface in juxtaposed relation thereto;
means for rotating said cover operatively connected therewith;
means for producing sufficient pneumatic pressure within said housing to hold said seeds within said pockets as said cover rotates; and
means for at least substantially shielding said seed pockets from said air flow as said pockets pass said seed-discharging portion whereby seeds fall from said pockets into said chute means;
the improvement comprising:
means including a wear plate disposed on at least a substantial portion of said margin of said opening for coacting with said peripheral portion of said seed metering member to establish at least a partial wear-resistant pneumatic seal between said metering member and said housing.

5. A metering apparatus for a seed planter as defined in claim 4 wherein said wear reduction means include a plurality of arcuate wear plate segments arranged around said margin of said opening.

6. A metering apparatus for a seed planter as defined in claim 4 wherein means are provided for biasing said peripheral portion of said metering member against said wear plate.

* * * * *